United States Patent
Krueger et al.

(10) Patent No.: US 6,920,990 B2
(45) Date of Patent: Jul. 26, 2005

(54) COLUMN PROTECTOR

(75) Inventors: Steven E. Krueger, Stevens Point, WI (US); Gary J. Rosenberg, Stevens Point, WI (US)

(73) Assignee: Steel King Industries, Inc., Stevens Point, WI (US)

( * ) Notice: Subject to any disclaimer, the term of this patent is extended or adjusted under 35 U.S.C. 154(b) by 96 days.

(21) Appl. No.: 10/346,781

(22) Filed: Jan. 21, 2003

(65) Prior Publication Data

US 2004/0149671 A1 Aug. 5, 2004

(51) Int. Cl.⁷ .............................. A47F 5/00; E04B 2/00
(52) U.S. Cl. ..................................... 211/183; 52/288.1
(58) Field of Search ............................... 211/183, 189, 211/191, 192; 52/244, 288.1, 287.1; 256/1; 248/552

(56) References Cited

U.S. PATENT DOCUMENTS

| | | | | |
|---|---|---|---|---|
| 3,303,937 A | * | 2/1967 | McConnell | 211/192 |
| 3,392,848 A | * | 7/1968 | McConnell et al. | 211/192 |
| 3,587,867 A | * | 6/1971 | Fenwick | 211/183 |
| 3,612,290 A | * | 10/1971 | Evans | 211/192 |
| 3,626,487 A | * | 12/1971 | Seiz | 211/192 |
| 3,681,885 A | * | 8/1972 | Goggins | 52/288.1 |
| 3,702,137 A | * | 11/1972 | Evans | 211/192 |
| 3,712,003 A | * | 1/1973 | Hallock et al. | 52/254 |
| 3,717,968 A | * | 2/1973 | Olsen et al. | 52/288.1 |
| 3,986,318 A | * | 10/1976 | McConnell | 403/384 |
| 4,088,229 A | * | 5/1978 | Jacoby et al. | 211/191 |
| 4,113,110 A | | 9/1978 | Mittag | 211/191 |
| 4,543,757 A | * | 10/1985 | Cosgrove | 52/295 |
| 4,898,285 A | * | 2/1990 | Field | 211/183 |
| 4,955,743 A | * | 9/1990 | King | 403/254 |
| 5,025,937 A | * | 6/1991 | King | 211/192 |
| 5,063,715 A | * | 11/1991 | Goodman | 52/36.6 |
| 5,078,283 A | * | 1/1992 | Wilson | 211/187 |
| 5,131,781 A | * | 7/1992 | Klein | 403/254 |
| 5,350,074 A | * | 9/1994 | Rosenband | 211/192 |
| 5,369,925 A | | 12/1994 | Vargo | 52/244 |
| 5,826,853 A | * | 10/1998 | Anello et al. | 248/552 |
| 6,003,697 A | | 12/1999 | Ferchat et al. | 211/189 |
| 6,203,234 B1 | * | 3/2001 | Olson | 403/254 |
| 6,230,910 B1 | * | 5/2001 | Olsson et al. | 211/192 |
| 6,241,109 B1 | * | 6/2001 | Kautz et al. | 211/192 |
| 6,247,594 B1 | * | 6/2001 | Garton | 206/512 |
| 6,257,557 B1 | * | 7/2001 | Anderson et al. | 256/1 |
| 6,332,549 B1 | | 12/2001 | MacDonald | 211/183 |
| 6,443,320 B1 | * | 9/2002 | Herzog et al. | 211/192 |
| 6,510,955 B2 | * | 1/2003 | Pellegrino | 211/192 |
| 6,595,379 B1 | * | 7/2003 | Powell | 211/192 |

* cited by examiner

Primary Examiner—Hugh B. Thompson, II

(57) ABSTRACT

A protector for an upright column of a product storage rack has a V-shaped body with flat side walls joined to a convex curved vertical apex section. Pairs of studs cooperate with keyhole slots in the column to releasably mount the protector on the column. A releasable latch mounted on the protector engages the column to prevent removal of the protector from the column. The latch can be moved out of engagement from the column to permit the protector to be removed from the column.

10 Claims, 5 Drawing Sheets

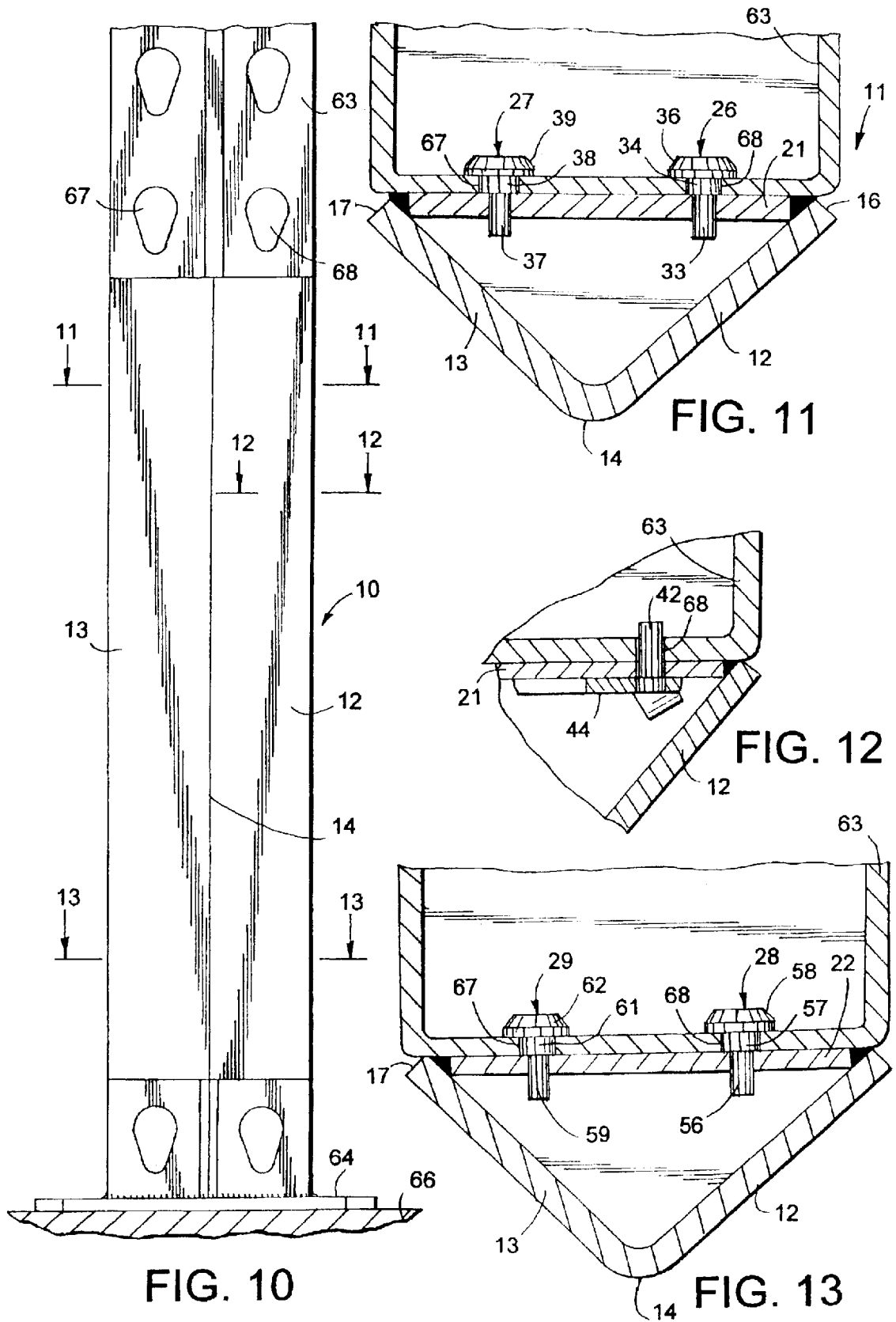

COLUMN PROTECTOR

FIELD OF THE INVENTION

The invention relates to protectors for columns or posts of racks for storing products to prevent damage to the racks from product handling vehicles. The protectors are releasably attached and locked to boltless columns of pallet racks.

BACKGROUND OF THE INVENTION

Pallet racks are frame structures having a number of upright columns or posts connected to generally horizontal beams. Decks, such as wire grids, supported on the beams, are used to carry products, boxes and pallets loaded with goods. The lower ends of the columns are supported on floors and other support surfaces. Material handling vehicles, such as fork trucks, are used to load and unload pallets and product from the racks. When the vehicles or pallets carried by the vehicles impact the columns, they can be bent and cause products to spill from the racks. The repair of damaged racks requires considerable time, labor, and cost. Post protectors are used to guard rack columns from shock and impact forces caused by forklifts and other vehicles hitting the columns. Examples of post protectors for rack columns are described in the following U.S. patents.

D. C. Mittag in U.S. Pat. No. 4,113,110 discloses a conventional storage rack having upright posts with keyhole slots and horizontal beams connected to the posts. A protector having an arcuate front section joined to inwardly directed legs is secured to a channel member. Attachment studs secured to the channel member coact with the keyhole slots in the posts to mount the protector on the post. The curved arcuate surface of the front section functions to laterally direct or glance off blows directed against the protector.

W. R. Vargo in U.S. Pat. No. 5,369,925 discloses pallet rack post protectors located around the lower portion of a post. Pins anchor protectors to the floor adjacent the bottom ends of the posts. The protectors have a general U-shape with a V base. Flanges on the lower end of protectors accommodate an elastic membrane which allows the protector to elastically move upon impact thereby absorbing the impact force of a vehicle hitting the protectors.

C. S. Ferchat et al in U.S. Pat. No. 6,003,697 discloses a support assembly for attaching a sign to a pallet rack. The pallet rack has upright posts connected to horizontal beams and horizontal base members. The support assembly has a lower semi-cylindrical bumper member jointed to the upright member.

J. D. MacDonald in U.S. Pat. No. 6,332,549 discloses a repair kit for a pallet rack frame having a front upright post. An angle deflector 22 is mounted on the lower portion of post 14. The bend in the angle deflector faces forward to deflect collisions from equipment such as forklifts. The deflector is secured with welds to the post to reinforce the base of the post.

SUMMARY OF THE INVENTION

The invention is a protective device for storage rack columns. The device is a column protector used to guard lower sections of columns or posts from direct impact forces from material handling vehicles, such as forklifts. The protector has a rigid body having outwardly diverging walls joined to a convex curved apex section. The walls and apex section of the body are impact barriers that absorb and deflect impact forces caused by forklifts that strike the protector. The protector is releasably mounted with connectors on the column. Bolts, welds, and other types of fasteners that require tools to attach the protector to the column are not used to mount the protector of the invention on the column. The protector can be mounted on existing storage rack columns. A releasable latch mounted on the protector cooperates with the column to prevent the protector from being removed from the column. The latch must be retracted from the column to allow the column to be moved to a position whereby the connectors can be disengaged from column to separate the protector from the column.

The preferred embodiment of the protector is used with an upright column having a wall with vertical rows of keyhole slots. The keyhole slots in each row of slots are vertically spaced from each other and converge in a downward direction. The vertical rows of keyhole slots allows the protector to be mounted on the column in selected vertical positions. The protector has a V-shaped metal body having first and second walls joined with a convex curved apex section. The body is a one-piece right angle member. The walls have flat outside surfaces that merge with the apex section whereby impact forces applied to the protector deflect or glance off laterally thereby reducing forces on the column. A top wall is secured to the upper portions of the first and second walls and apex section. Upper and lower transverse plates are connected to the outer edges of the first and second walls. The top wall and transverse plates laterally reinforce the first and second walls of the body. A first pair of first studs are secured to and extend rearwardly from the upper plate. A second pair of second studs are secured and extended rearwardly from the lower plate. The second studs are vertically aligned with the first studs. Each stud has an enlarged head adapted to be inserted through the large portion of a keyhole slot and moved down into engagement with the wall of the column to mount the protector on the column. The protector must be moved in an upward direction to release the studs from the column before the protector can be removed from the column. A latch having a lock pin extended through a keyhole slot and engageable with the column prevents the protector from being moved upwardly thereby preventing removal of the protector from column. A member mounted on the upper plate holds the lock pin in locking engagement with the column. When lock pin is moved out of engagement with the column, the protector can be moved upward and removed from the column.

DESCRIPTION OF DRAWING

FIG. 10 is a front elevational view of the protector mounted on a column of a rack;

FIG. 11 is an enlarged sectional view taken along line 11—11 of FIG. 10;

FIG. 12 is an enlarged sectional view taken along line 12—12 of FIG. 10; and

FIG. 13 is an enlarged sectional view taken along line 113—13 of FIG. 10.

DESCRIPTION OF PREFERRED EMBODIMENT

Figure 1:
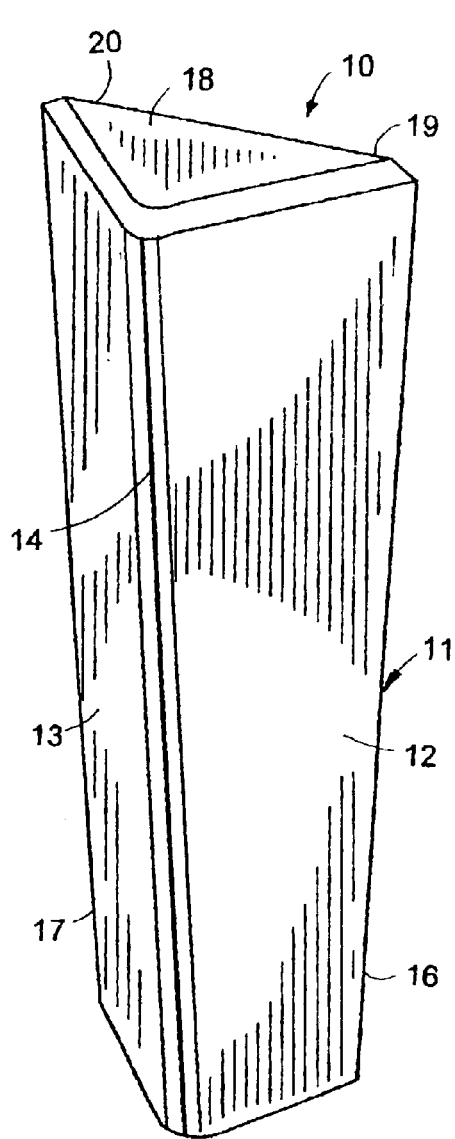
FIG. 1 is a perspective view of the column protector of the invention.
Figure 2:
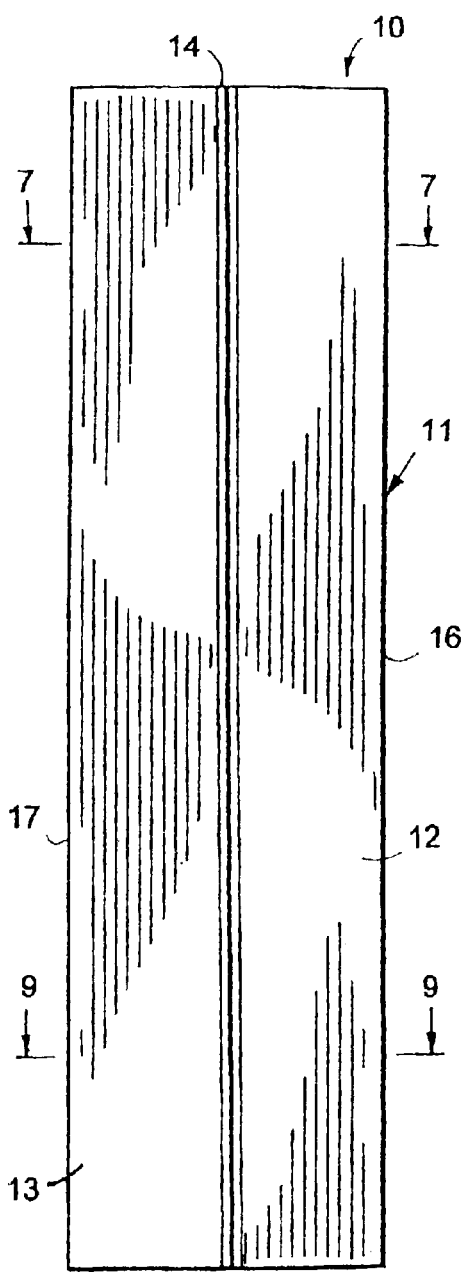
FIG. 2 is a front elevational view of FIG. 1.

Protector 10, shown in FIGS. 1 and 2, is a shield and guard for a column of a rack. In use, protector 10 is mounted on a lower portion of a column or post to prevent damage to the column from material handling vehicles and pallets and articles transported by their vehicle. Protector 10 is adapted to be mounted on columns of storage racks in use in warehouses and locations using product racks.

Figure 3:
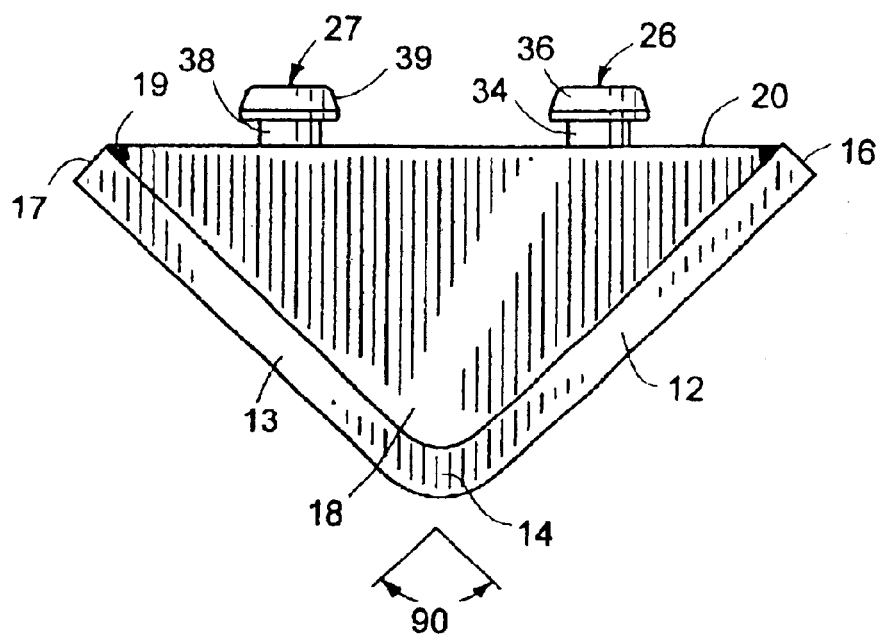
FIG. 3 is a top plan view of FIG. 1.
Figure 4:
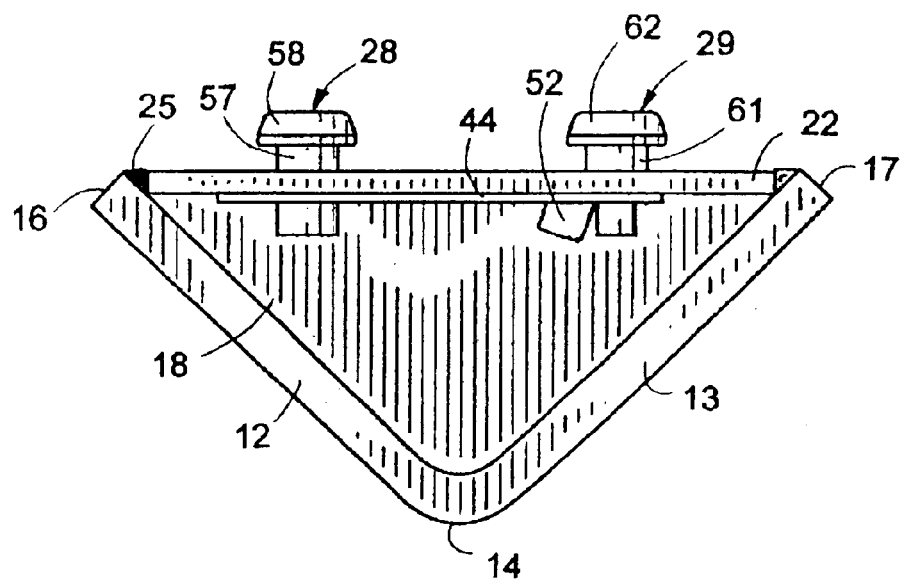
FIG. 4 is a bottom plan view of FIG. 1.
Figure 5:
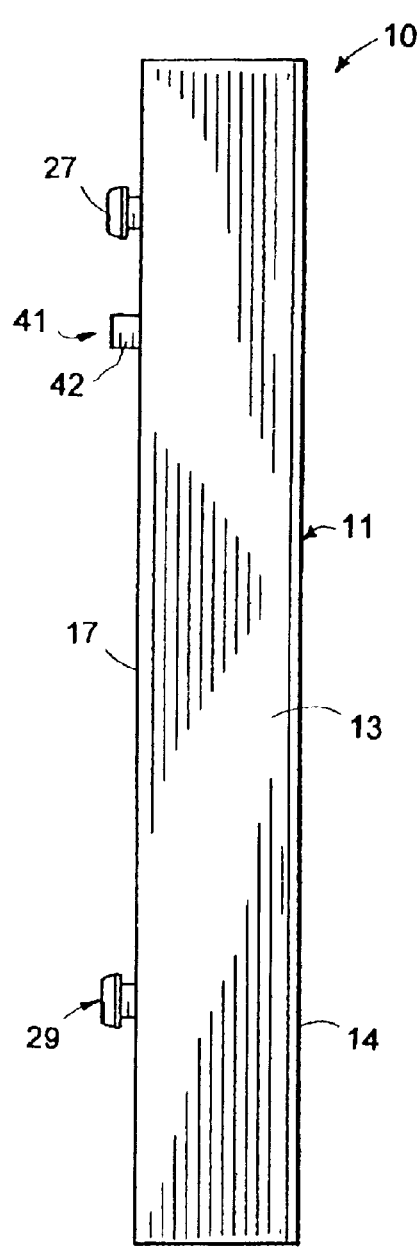
FIG. 5 is a side elevational view of the left side of FIG. 1.

Protector 10 has a right angle body 11 having first and second rectangular walls 12 and 13 joined to an upright linear apex section 14. Walls 12 and 13 are identical in size and shape and extend from the bottom to the top of protector 10. The width of each wall is uniform throughout the length of the wall. As shown in FIG. 3, walls 12 and 13 are orientated 90 degrees relative to each other. Other angular relationships can be used for walls 12 and 13. Apex section 14 has a rounded or convex curved outer surface with no sharp edges. Walls 12 and 13 have flat upright rectangular outer surfaces that merge with the convex curved outer surface of apex section 14. The flat outside diverging surfaces of walls 12 and 13 and convex curved apex section 14 cause impact forces to deflect or glace off laterally thereby reducing the forces applied to the column supporting the protector 10. Walls 12 and 13 have upright linear outside edges 16 and 17. Body 11 is a one-piece strong metal member, such as steel. Other materials, such as ultra high molecular weight plastic, can be used for body 11.

As shown in FIGS. 1 and 3, a triangular top wall 18 is secured with welds 19 to the top of walls 12 and 13 and apex section 44. Wall 18 is a metal plate located flush with the tops of walls 12 and 13. Wall 18 has a transverse linear rear edge 20 extended between edges 16 and 17 of walls 12 and 13.

An upper plate 21, shown in FIGS. 6 and 7, located below top wall 18 is secured with welds 23 and 24 to walls 12 and 13. Plate 21 is a flat metal member extended transversely between edges 16 and 17 of walls 12 and 13. Plate 21 has transversely spaced holes 31 and 32 accommodating studs 26 and 27. Stud 26 has a cylindrical body 33 joined to a cylindrical neck 34 in contact with the outside surface of plate 21. An enlarged head 36 joined to neck 34 is spaced by neck 34 outwardly of the outside surface of plate 21. Body 33 has a tight friction force fit in hole 31 to permanently join stud 26 to plate 21. Stud 27 has the same structure as stud 26, shown as cylindrical body 37, cylindrical neck 38 and head 39. Body 37 has a tight friction force fit in hole 32 to permanently join stud 27 to plate 21. Studs 26 and 27 are transversely spaced from each other a distance corresponding to keyhole slots in a column of a rack.

Figure 6:
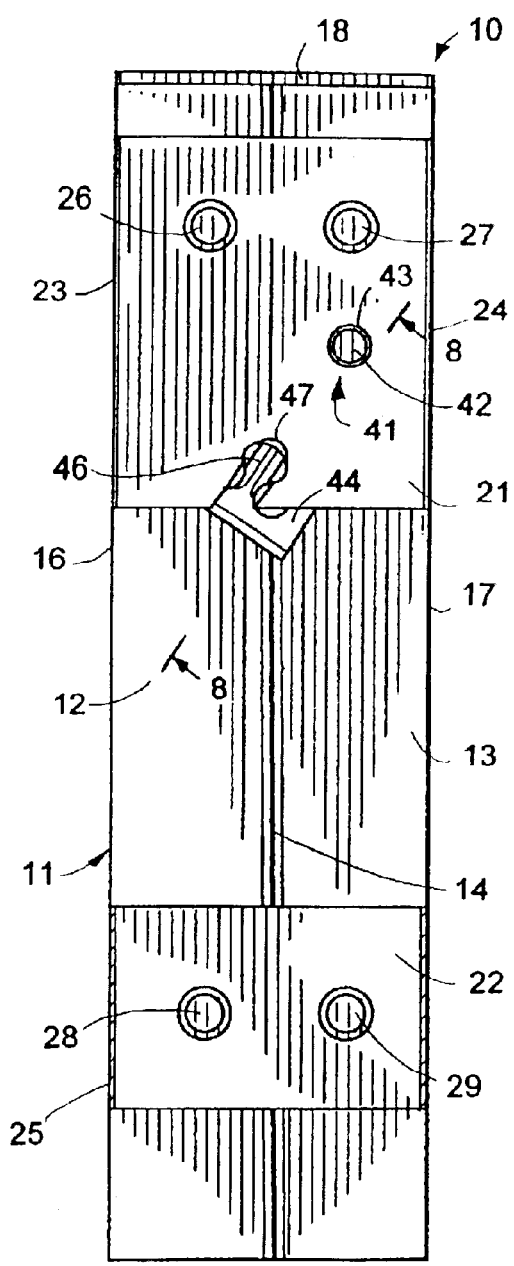
FIG. 6 is a rear elevational view of FIG. 1.
Figure 7:
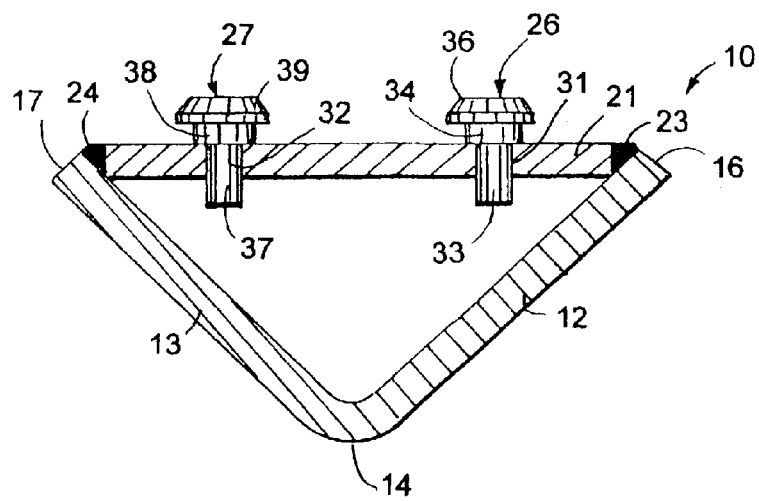
FIG. 7 is a sectional view taken along line 7—7 of FIG. 2.
Figure 8:
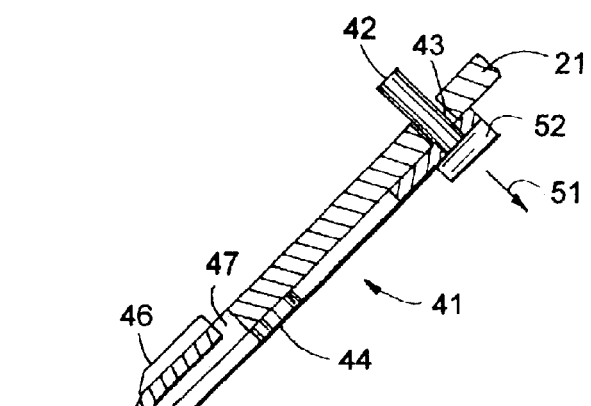
FIG. 8 is a sectional view taken along line 8—8 of FIG. 6.

As shown in FIGS. 6 and 8, a latch 41 mounted on plate 21 is operable to lock protector 10 on the column. Latch 41 has a lock pin 42 extended through hole 43 in plate 21 and an aligned slot in the column. Pin 42 when in the lock position prevent the protector 10 from being moved upward and separated from the column. Hole 43 is located below and vertically aligned with stud 27. Pin 42 is secured to a flat bar 44 located behind plate 21. Member or flat bar 44 has an outside U-shaped tab 46 extended into a slot 47 in a lower portion of plate 21. Tab 46 pivotally retains member 44 on plate 21. As shown in FIG. 8, when the lower end 48 of member 44 is moved in the direction of arrow 49, pin 42 moves in the direction of arrow 51 to an unlock or release position whereby protector 10 can be moved upward and removed from the column. An ear 52 on bar 44 adjacent pin 42 is a stop member that contacts wall 13 to limit movement of pin 42 in the direction of arrow 51 so as to retain a portion of pin 42 in hole 43. When the force on end 48 of member 44 is released, bar 44 springs back adjacent plate 21 thereby projecting pin 42 laterally of plate 21 to its lock position.

Figure 9:
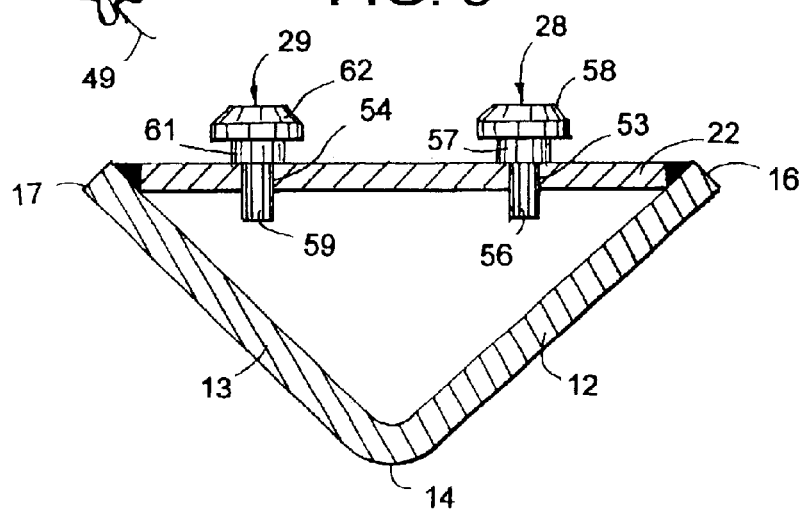
FIG. 9 is a sectional view taken along line 9—9 of FIG. 2.

As shown in FIGS. 6 and 9, studs 28 and 29 are laterally spaced from each other and longitudinally aligned with studs 26 and 27. Stud 28 has a cylindrical body 56 extended through hole 53 in plate 22. Body 56 has a tight force fit with plate 22 to anchor stud 28 on plate 22. A Cylindrical neck 57 joined to body 56 supports a head 58. Stud 29 has a cylindrical body force fitted in a hole 54 in plate 22. A cylindrical neck 61 joined to body 48 is connected to a head 62. Studs 26–29 are metal members. Other materials for the studs and connections to plates 21 and 22 can be used.

An example of one embodiment of protector 10 has a ⅜ inch right angled steel body 11 having a length of 12 inches. Each wall 12 and 13 has a width of 2 inches. The convex curve of the apex has a 0.5 inch radius with opposite portions coextensive with the outside rectangular surfaces of walls 12 and 13. The necks of studs 26–29 has 0.375 inch diameters joined to heads having 0.62 inch diameters. Studs 26 and 27 are laterally spaced 1.5 inches. Studs 28 and 29 are vertically aligned with studs 28 and 29 and laterally spaced 1.5 inches. Studs 26 and 27 are longitudinally spaced 8 inches from studs 28 and 29. Protector 10 can be made of high strength materials other than steel, such as high density plastic and composite materials. The size and shape of the body and locations of the studs can be changed to accommodate different types of rack columns and slots in the columns.

In use, as shown in FIGS. 10–13, column protector 10 is mounted on a rack column 63 secured to a base 64 resting on a support 66, such as a floor. Column 63 is an upright rectangular metal member or post having vertical rows of keyhole-shaped slots or holes 67 and 68 in one or more side walls of the column. Adjacent keyhole-shaped slots are vertically spaced from each other along the length of column 63. The upper ends of slots 67 and 68 are larger than heads 36, 39, 58 and 62 of studs 26–29 to allow the heads to be moved through the slots. The lower ends of slots 67 and 68 are smaller than heads 36, 39, 58 and 62 of studs 26–29 whereby the heads retain protector 10 on column 63. Protector 10 is mounted on column 63 by positioning the protector adjacent the side of column 63 with studs 26–29 aligned with the upper ends of slots 67 and 68. Protector 10 is then moved toward column 63 and downward to locate studs 26–29 in the bottom sections of slots 67 and 68 to mount protector 10 on column 63. As shown in FIG. 12, lock pin 42 extends through slot 68 when protector 10 is in the down attached position. Pin 42 located in the upper section of slot 68 prevents protector 10 from moving up to its release position. Pin 42 must be retracted from slot 68 to allow protector 10 to be moved up to a release position before protector can be moved upward and removed from column 63.

The described column protector is one embodiment of the invention. Changes in materials, arrangement and combinations of structures and parts can be made by persons skilled in the art without departing from the scope of the invention.

What is claimed is:

1. A protector for a column having vertical rows of keyhole slots comprising: an angled body having outwardly diverging first and second walls and a convex curved apex section joining said first and second walls, said first and second walls having flat outside upright surfaces, said flat outside surfaces located about 90 degrees relative to each other, a generally triangular and horizontal top wall secured to upper portions of the first and second walls and apex section, an upright upper plate extended between and secured to the first and second walls, an upright lower plate extended between and secured to the first and second walls below the upper plate, said upper and lower plates laterally reinforcing said first and second walls, a pair of first studs secured to and extended rearwardly from the upper plate, each first stud having a neck and head joined to the neck adapted to be inserted through a keyhole slot and mounted on the column, a pair of second studs secured to and extended rearwardly from the lower plate, each second stud having a neck and head joined to the neck and adapted to be inserted through a keyhole slot and mounted on the column, and a releasable latch mounted on the upper plate, said latch having a generally flat bar located behind the upper plate, a lock pin secured to the bar, and a tab secured to the bar to pivotally retain the bar on the upper plate in engagement with the upper plate, said upper plate having a hole positioned to be aligned with one keyhole slot in the column, said lock pin extended through said hole in the upper plate and adapted to extend into said one keyhole slot to locate the lock pin in a lock position adapted to engage the column to prevent the protector from being removed from the column, said bar being movable away from the upper plate to move said lock pin out of the one keyhole slot to an unlock position out of engagement with the column whereby the first and second studs can be moved up in the keyhole slots to allow the protector to be removed from the column.

2. The protector of claim 1 wherein: the body is a right angle one-piece metal member.

3. The protector of claim 1 wherein: the top wall is secured with welds to the upper portions of the first and second walls and apex section.

4. The protector of claim 1 wherein: the first and second walls having outside linear edges, said upper and lower plates being secured to said linear edges.

5. The protector of claim 1 wherein: the pair of first studs are vertically aligned with the pair of second studs.

6. The protector of claim 1 wherein: the pair of first studs are laterally spaced studs.

7. The protector of claim 1 wherein: the pair of second studs are laterally spaced studs.

8. A protector for a column having slots comprising: a body having outwardly diverging first and second walls and a convex apex section joining said first and second walls, a top wall secured to upper portions of the first and second walls, plate means extended between and secured to the first and second walls for laterally reinforcing said first and second walls, releasable connectors secured to the plate means adapted to be mounted on the column to retain the protector on the column, and a releasable latch having a generally flat bar located behind the plate means, a lock pin secured to the bar, and a tab secured to the bar to pivotally retain the bar on the plate means in engagement with the plate means, said plate means having a hole adapted to be positioned in alignment with one slot in the column, said lock pin extended through said hole in the plate means and adapted to extend into said one slot in the column to locate the lock pin in a lock position to prevent the protector from being removed from the column, said bar being movable away from the plate means to move said lock pin out of said one slot to an unlock position whereby the protector can be removed from the column.

9. The protector of claim 8 wherein: the body is a one-piece member, and said first and second walls each having generally flat outside surfaces.

10. The protector of claim 8 wherein: the releasable connectors include stud means secured to the plate means for mounting the protector on the column.

* * * * *